Figure 1:
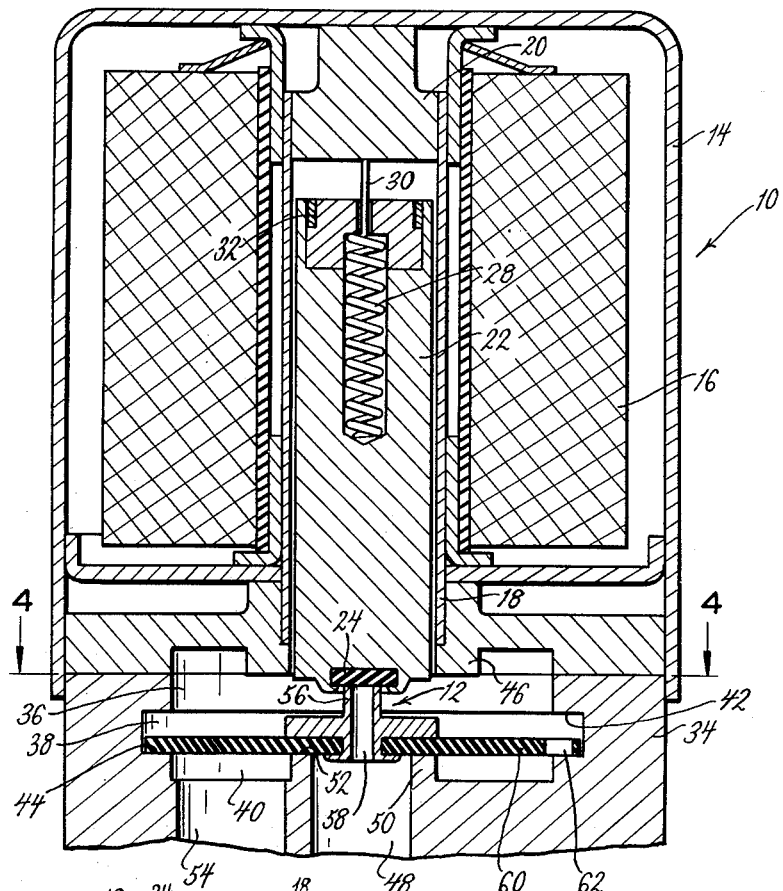

March 13, 1956  F. J. VARGO  2,738,157

AMPLIFYING MEMBER FOR PILOT OPERATED VALVES

Filed Sept. 25, 1952

INVENTOR.
FRANK J. VARGO
BY *Gravely, Lieder,*
*Woodruff & Dees*
ATTORNEYS

United States Patent Office 2,738,157
Patented Mar. 13, 1956

2,738,157
AMPLIFYING MEMBER FOR PILOT OPERATED VALVES

Frank J. Vargo, University City, Mo., assignor to Jackes-Evans Manufacturing Company, St. Louis, Mo., a corporation of Missouri Application September 25, 1952, Serial No. 311,397

7 Claims. (Cl. 251—30)

The present invention relates generally to the valve art and more particularly to a novel amplifying member for pilot-operated valves and the like, which is operated by the pressure of the fluid being handled by the valve.

It is an object of the present invention to provide a novel amplifying member for use in pilot-operated valves and the like, which is extremely simple in construction, and which facilitates the assembly and interchangeability of parts. More particularly it is an object to provide such a device which is not fastened to the supporting housing whereby it can be easily and quickly assembled and disassembled. Specifically, it is an object to provide a disc-like valve member which is loosely positioned within a chamber contained in the valve housing so as to have free limited lateral and axial movement relative to the housing.

Another object is to provide an amplifying member which functions satisfactorily with dirt and other solids carried by the fluids flowing through the valve. More particularly it is an object to provide such a member which contains an opening therethrough for use during the operation of the valve, the size of the opening being relatively large during one phase of the operation so that particles of dirt and other solid matter can pass through it, and relatively small during another phase of the operation for the satisfactory operation of the valve. Specifically, it is an object to provide a disc-like valve member with an equalizing slot adjacent its outer periphery which is partially masked by the housing wall during certain phases of the operation and which is completely open during other phases of the operation so that dirt and the like can pass therethrough.

Further objects and advantages will be apparent from the following detailed description, reference being had to the accompanying drawing wherein a preferred embodiment of the present invention is shown.

Briefly, the invention comprises an amplifying member for use within a valve chamber containing an outlet and spaced axially opposed shoulders, the amplifying member containing a pilot port therethrough in alignment with the outlet and being movable between an open position away from the outlet and a closed position in which it cooperates with the outlet to prevent the flow of fluid therethrough. The amplifying member includes a flexible disc-like portion which is unattached to the housing and which has limited lateral and axial movement within the chamber. The disc-like portion contains a pressure equalizing slot adjacent the outer periphery thereof which is partially masked when the disc-like portion is in contact with either of the shoulders and fully open in any position therebetween.

Figure 2:
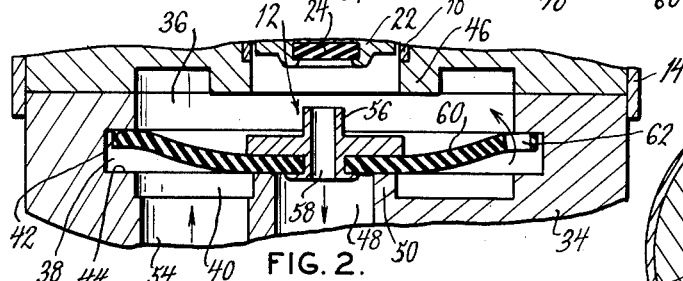
Figure 4:
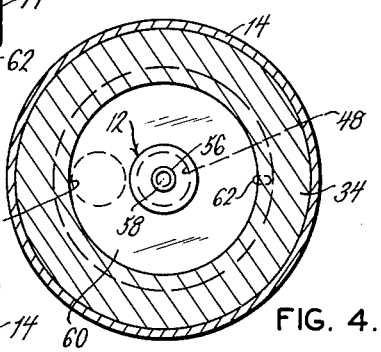
Figure 3:
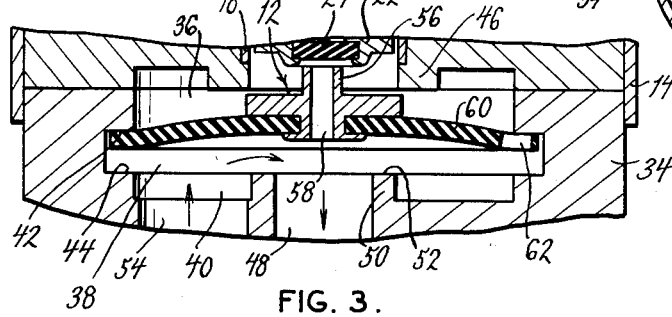

In the drawing:

Fig. 1 is a somewhat schematic vertical axial sectional view of a pilot-operated valve provided with an amplifying member constructed in accordance with the teaching of the present invention, the amplifying member being shown in the fully closed position, Fig. 2 is a fragmentary sectional view similar to the bottom portion of Fig. 1, but showing the amplifying member in an intermediate open position, Fig. 3 is a fragmentary sectional view similar to Fig. 2, but with the amplifying member in the fully open position, and Fig. 4 is a horizontal sectional view taken on the line 4—4 in Fig. 1.

Referring to the drawing more particularly by reference numerals, 10 indicates generally a solenoid pilot-operated valve containing an amplifying member 12 embodying the teachings of the present invention.

The solenoid valve 10, which is for the most part of conventional construction, includes a housing 14 within which is mounted a coil 16. An enclosing or guiding tube 18 is fixedly mounted within the coil 16 and contains a closure member 20 at the upper end thereof.

Reciprocally mounted within the enclosing tube 18 is a plunger or armature 22 which has a pilot valve member 24 at its lower end, for a purpose to appear.

A cavity is contained in the upper end of the armature 22, and positioned therein is a coiled return spring 28 which has an upper end 30 extending upwardly beyond the upper end of the armature and in contact with the bottom surface of the closure member 20. The armature 22 is provided with the usual shading band 32 at the upper end thereof, to prevent chattering.

A two-piece valve body 34, which is held together by machine screws (not shown), is positioned adjacent the lower end of the enclosing tube 18 and contains a cylindrical valve chamber which, for convenience of description, will be referred to as being divided into an upper chamber 36, an intermediate chamber 38, and a lower chamber 40.

The intermediate chamber 38 is of slightly larger diameter than the other two so as to provide an upper shoulder 42 and a lower shoulder 44 between them.

Extending downwardly into the upper chamber 36 is an annular portion 46 which is, in effect, an extension of the enclosing tube 18.

A fluid outlet 48 is provided at the center of the valve body 34 for communication with the intermediate chamber 38, and surrounding it is an upwardly extending annular portion 50 which provides a valve seat 52 at the upper end thereof.

Spaced to one side of the outlet 48, is a fluid inlet 54 which is in communication with the lower chamber 40.

The amplifying member 12 is positioned within the valve chamber and includes a hub or body member 56 which contains a pilot port 58 extending axially therethrough, and which is fastened to a flexible disc-like member 60. The disc-like member 60 is slightly smaller in diameter than the intermediate chamber 38 so that it has limited movement both laterally and axially relative thereto. An equalizer slot 62 is provided in the disc-like member 60 adjacent its outer peripheral edge, and, as shown in Figs. 1 and 2, it is of a size, and is positioned so that it is substantially closed when the disc 60 is in contact with either the upper shoulder 42 or the lower shoulder 44, for a purpose to appear.

Operation

The solenoid portion of the device operates in the conventional manner so that when the coil 16 is de-energized, the plunger or armature 22 is urged downwardly by gravity and the return spring 28. In this inoperative position (Fig. 1), the pilot valve member 24 at the lower end of the armature 22 closes off the upper end of the pilot port 58 and maintains the disc 60 on top of the valve seat 52 so as to close off the outlet 48. In this position, the outer periphery of the disc 60 rests on the lower shoulder 44, and the equalizer slot 62 is partially blocked or masked by the shoulder 44. However, the upper chamber 36 and the intermediate chamber 38 are in communication with the lower chamber 40 and inlet through the equalizing slot 62, whereby the fluid pressure above the disc 60 is the same as the pressure in the lower chamber 40 below it, which is the same as the inlet pressure. The pressure in the outlet 48 and in the pilot port 58 is something less than the inlet pressure.

When the coil 16 is energized to cause the armature 22 to move upwardly against the action of the spring 28 (Fig. 2), the upper end of the pilot port 58 is opened so as to permit the fluid from above the disc 60 to be exhausted downwardly through the port 58 and into the outlet 48, thereby reducing the pressure above the disc 60. This permits the fluid to flow from the inlet 54 and the lower chamber 40, upwardly around the outer periphery of the disc 60 and through the slot 62, so as to carry the outer peripheral edge of the disc 60 upwardly into contact with the upper shoulder 42 (Fig. 2).

It will be noted that during the movement of the outer periphery of the disc 60 from the lower shoulder 44 to the upper shoulder 42, the equalizing slot 62 is fully open so that any dirt or solid matter carried in the fluid can pass through it, but that when the periphery engages the upper shoulder 42, the slot 62 is blocked or masked so as to materially reduce the flow of fluid therethrough.

The intermediate pressure created above the amplifying member 12 by the opening of the pilot port 58 and the limited fluid flow through the equalizer slot 62, provides a pressure differential across the amplifying member 12 which causes it to move upwardly and away from the valve seat 52 (Fig. 3) so as to fully open the outlet 48 and place it in direct communication with the inlet 54.

The size of the equalizer slot 62 cannot be too great relative to the size of the pilot port 58, otherwise it would be impossible to cause a sufficient pressure drop across the amplifying member to cause it to move upwardly.

The body member 56 may move upwardly until it contacts the depending portion 46, or it may reach a state of equilibrium a short distance from the valve member 24 carried by the armature 22. In short, if the body member 56 moves upwardly so as to contact the valve member 24 and close off the pilot port 58, fluid will flow upwardly through the equalizer slot 62 and tend to equalize the pressure on both sides of the amplifying member 12, thereby causing the latter to move downwardly due to the force of gravity. However, as soon as the body member 56 moves away from the valve member 24 at the bottom of the plunger 22, the pressure above the amplifying member 12 is immediately relieved through the pilot port 58 so as to cause the amplifying member to be moved upwardly again by the predominating pressure below the amplifying member.

To close the valve, the coil 16 is de-energized to permit the armature 22 to move downwardly under the action of gravity and the return spring 28 so as to contact the hub or body portion 56, close off the pilot port 58, and urge the amplifying member 12 in the downward direction. This downward movement is assisted by the equalization of the pressure across the amplifying member 12 when the pilot port 58 is closed. Thus, the closing of the pilot port 58 by the valve member 24 prevents the exhausting of the fluid from above the amplifying member 12 so that the pressure above it soon approaches inlet pressure due to the upward flow of the fluid through the equalizer slot 62. The amplifying member 12 then settles onto the valve seat 52 so as to close off the outlet 48, and the outer peripheral edge of the disc 60 moves from the upper shoulder 42 to the lower shoulder 44 (Fig. 1). During this closing movement of the amplifying member 12, the equalizer slot 62 is again fully open so as to permit solid particles to pass therethrough.

Thus it is apparent that there has been provided a novel amplifying member which fulfills all of the objects and advantages sought therefor. It is extremely simple in construction and consists of two parts which are relatively easy to fabricate.

Furthermore, it is easily and quickly assembled or replaced because it is not fastened in any way to the valve housing.

Also, the effective opening of the equalizer slot 62 is relatively small when the disc 60 is in contact with either the upper shoulder 42 or the lower shoulder 44 so that the amplifying member 12 operates properly. And, during the movement of the disc 60 between the shoulders, the opening is relatively large so that dirt and other solid particles carried by the fluid can pass therethrough.

In addition, because the outer peripheral edge of the disc 60 is not fastened to the valve housing, the amplifying member 12 can move axially between the open and closed positions without stretching the disc-like member 60.

It is to be understood that the foregoing description and the accompanying drawing have been given only by way of illustration and example, and that changes and alterations in the present disclosure, which will be readily apparent to one skilled in the art, are contemplated as within the scope of the present invention which is limited only by the claims which follow.

What is claimed is:

1. In combination, a valve housing containing a chamber; an inlet and an outlet into the chamber; a valve seat associated with the outlet; spaced, axially opposed shoulders in the chamber; an amplifying member positioned within the chamber and movable between the shoulders for sealing engagement therewith between an open position away from the valve seat and a closed position in which it cooperates with the valve seat to aid in preventing the passage of fluid through the outlet, the amplifying member including a disc-like portion unattached to the housing and having free limited axial and lateral movement within the chamber relative to the housing; a pilot port in the amplifying member; a control member for cooperation with the pilot port for selectively closing it; and an equalizer opening through the disc-like portion positioned relative to the shoulders so as to be partially masked thereby when the disc-like portion is in contact with them, and fully open when the disc-like portion is away from the shoulders, the equalizer opening being of less capacity than the pilot port when the disc-like portion is in contact with either of the shoulders.

2. In combination, a valve housing containing a chamber; an inlet and an outlet into the chamber; a valve seat associated with the outlet; spaced, axially opposed shoulders in the chamber; an amplifying member positioned within the chamber and movable between the shoulders between an open position away from the valve seat and a closed position in which it cooperates with the valve seat to aid in preventing the passage of fluid through the outlet, the amplifying member including a flexible disc-like portion unattached to the housing and having free limited axial and lateral movement within the chamber relative to the housing and movable into sealing engagement with the shoulders; an equalizer opening through the disc-like portion positioned relative to the shoulders so as to be partially masked thereby when the disc-like portion is in contact with them, and fully open when the disc-like portion is away from the shoulders; a pilot port through the amplifying member having one end thereof in communication with the outlet when the amplifying member is in the closed position; the equalizer opening being of less capacity than the pilot port when the disc-like portion is in contact with either of the shoulders; and means for selectively opening or closing the other end of the pilot port.

3. In combination, a valve housing containing a cylindrical chamber having spaced, axially opposed shoulders adjacent the outer periphery thereof; an outlet passage from the chamber positioned centrally thereof; a valve seat associated with the outlet passage; an amplifying member positioned within the chamber and movable between the shoulders between an open position away from the valve seat and a closed position in which it cooperates with the valve seat to aid in preventing the passage of fluid through the outlet; an inlet passage into the chamber on the same side of the amplifying member as the outlet passage; the amplifying member including a flexible disc-like portion unattached to the housing and having free limited axial and lateral movement within the chamber relative to the housing and movable into sealing engagement with the shoulders; an equalizer opening through the disc-like portion adjacent the outer periphery thereof and positioned relative to the shoulders so as to be partially masked thereby when the disc-like portion is in contact with either of them, and fully open when the disc-like portion is away from the shoulders; a pilot port through the amplifying member in alignment with the outlet passage so as to have one end thereof in communication with it when the amplifying member is in the closed position; the equalizer opening being of less capacity than the pilot port when the disc-like portion is in contact with either of the shoulders; and means for selectively opening or closing the other end of the pilot port and for moving the amplifying member toward the closed position.

4. In combination, a valve housing containing a chamber; an inlet and an outlet into the chamber; spaced, axially opposed shoulders in the chamber; an amplifying member positioned within the chamber and being unattached to the housing and having free limited axial and lateral movement within the chamber relative to the housing, the amplifying member being movable into sealing engagement with either of the shoulders; equalizer passage means through the amplifying member positioned relative to the shoulders so as to be partially masked thereby when the amplifying member is in contact with either of them; a pilot port through the amplifying member, said pilot port being of greater capacity than the equalizer passage means when the amplifying member is in contact with either of the shoulders; and means for selectively opening or closing the pilot port.

5. In combination, a valve housing containing a chamber; an inlet and an outlet into the chamber; a valve seat associated with the outlet; spaced, axially opposed shoulders in the chamber; an amplifying member unattached to the housing positioned within the chamber and having free limited axial and lateral movement relative to the housing, said amplifying member being movable between an open position away from the valve seat and a closed position in engagement therewith, the amplifying member including a disc-like portion having an outer periphery movable between the shoulders for sealing engagement therewith; a pilot port in the amplifying member having one end thereof in communication with the outlet when the amplifying member is in the closed position; an equalizer opening in the amplifying member of lesser capacity than the pilot port; and a control member for cooperation with the pilot port for selectively closing it.

6. In combination, a valve housing containing a chamber; an inlet and an outlet into the chamber; a valve seat associated with the outlet; spaced, axially opposed shoulders in the chamber; an amplifying member unattached to the housing positioned within the chamber and having free limited axial and lateral movement relative to the housing, said amplifying member being movable between an open position away from the valve seat and a closed position in engagement therewith, the amplifying member including a flexible disc-like portion having an outer periphery movable between the shoulders for sealing engagement therewith, said disc-like portion being sufficiently flexible whereby the outer periphery thereof moves between the opposed shoulders while the amplifying member remains in the closed position relative to the valve seat; a pilot port in the amplifying member having one end thereof in communication with the outlet when the amplifying member is in the closed position; an equalizer opening in the amplifying member of lesser capacity than the pilot port; and a control member for cooperation with the pilot port for selectively closing it.

7. In combination, a valve housing containing a cylindrical chamber having spaced, axially opposed shoulders adjacent the outer periphery thereof; an outlet passage from the chamber positioned centrally thereof and having a valve seat associated therewith; an amplifying member unattached to the housing positioned within the chamber and having free limited axial and lateral movement relative to the housing, said amplifying member being movable between an open position away from the valve seat and a closed position in engagement therewith, the amplifying member including a disc-like portion having an outer periphery movable between the opposed shoulders for sealing engagement therewith and a hub portion containing a pilot port having one end thereof in communication with the outlet when the amplifying member is in the closed position; an inlet passage into the chamber on the same side of the amplifying member as the outlet passage; an equalizer opening in the amplifying member of lesser capacity than the pilot port; and a control member for cooperation with the other end of the pilot port for selectively closing it.

References Cited in the file of this patent

UNITED STATES PATENTS

| | | |
|---|---|---|
| 1,368,251 | Ehrhart | Feb. 15, 1921 |
| 1,807,191 | Boyle | May 26, 1931 |
| 1,830,005 | Sloan | Nov. 3, 1931 |
| 1,954,804 | Doble | Apr. 17, 1934 |
| 2,255,322 | Langdon | Sept. 9, 1941 |
| 2,270,838 | Langdon | Jan. 20, 1942 |
| 2,620,826 | Johns | Dec. 9, 1952 |